United States Patent [19]

Hirano et al.

[11] 4,341,274

[45] Jul. 27, 1982

[54] COMBINATION WEIGHING DEVICE

[75] Inventors: Takashi Hirano, Kobe; Takashi Aga, Akashi, both of Japan

[73] Assignee: Yamato Scale Company, Ltd., Hyogo, Japan

[21] Appl. No.: 251,396

[22] Filed: Apr. 6, 1981

[51] Int. Cl.³ .......................................... G01G 13/02
[52] U.S. Cl. ...................................... 177/25; 177/50; 177/123
[58] Field of Search ....................... 177/1, 25, 50, 123; 364/567

[56] References Cited

U.S. PATENT DOCUMENTS

| 3,939,928 | 2/1976 | Murarami | 177/25 |
| 4,267,894 | 5/1981 | Hirano | 177/25 |
| 4,308,928 | 1/1982 | Oshima | 177/25 |

Primary Examiner—Joseph W. Hartary

Attorney, Agent, or Firm—Eugene E. Geoffrey, Jr.

[57] ABSTRACT

A combination weighing device, used for grouping a mass of articles having substantial variance in their weights into groups each having a substantially constant total weight, by weighing some of these articles by a plurality of weighing balances having automatic article loading and unloading means, summing up the measured weights successively in accordance with a predetermined set of combinations of the balances and, when the sum falls in a predetermined range of weight, supplying control signals to the unloading means of the corresponding balances to collect the articles from them and when no control signal is supplied to the unloading means due to lack of desired combined weight, the loading means of the weighing balance carrying the least weight is automatically actuated to add some articles to the balance to make it possible to obtain the desired combined weight.

2 Claims, 1 Drawing Figure

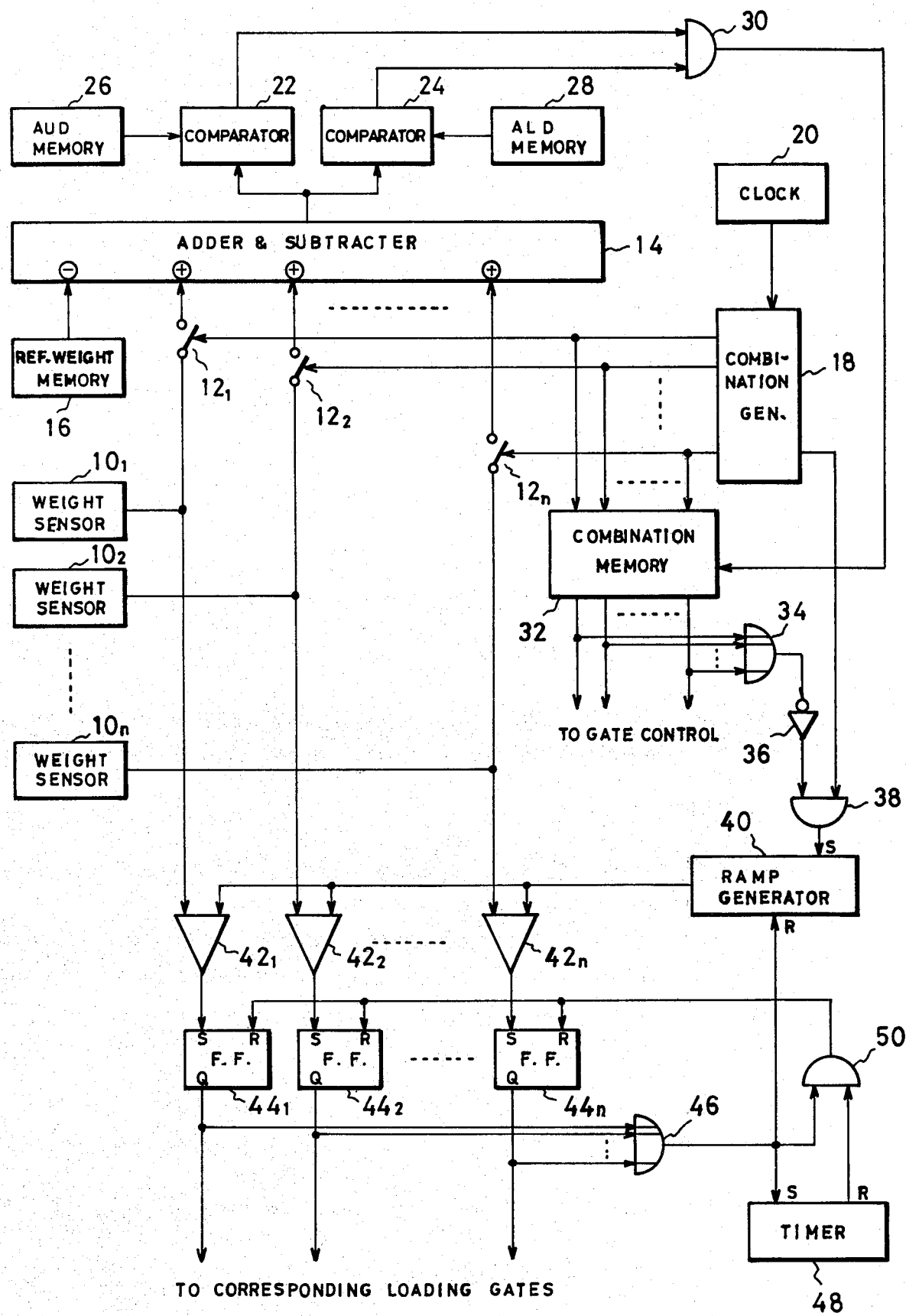

COMBINATION WEIGHING DEVICE

This invention relates to a combination weighing device used for grouping a mass of articles into groups having substantially constant total weight.

The weighing device which is generally referred to as "combination balance" or "combination weighing device" is used for grouping a mass of articles, such as cakes, fish and vegetables, having substantially large variances in their weights, into groups each having substantially constant total weight within a predetermined range of weight. This device is useful to pack such articles so that each pack has a predetermined weight and a typical example thereof is disclosed in U.S. Pat. No. 3,939,928. Pending U.S. applications Ser. No. 102,660 filed Dec. 12, 1979 now U.S. Pat. No. 4,267,894 and Ser. No. 164,315 filed June 30, 1980 now U.S. Pat. No. 4,308,928 relates to improvements of this device. As described in these United States patent specifications, some articles are automatically loaded on each of a plurality of weighing balances and the measured weight of each balance is derived as an electric signal. The weight signals from the respective balances are summed up successively in accordance with a predetermined set of mathematical combinations and, when the sum falls within a predetermined range, control signals are supplied to the unloading means of the corresponding weighing balances to collect the articles therefrom.

Such a combination weighing device may encounter such an accident that no sum of the weights of articles falls in the predetermined range during execution of the predetermined set of combinations. This accident results in interruption of operation. In the prior art device, it is a general practice for overcoming this problem that a few articles are added to or removed from one or more of the weighing balances and then the device is caused to execute new cycle of combination. However, the combined weight may be out of the predetermined range when the articles are added to the balance carrying the greatest weight or removed from the balance carrying the least weight. Thus, this method is very troublesome and time-consuming and reduces efficiency of the device.

Therefore, an object of this invention is to provide an improved combination weighing device having means for automatically supplying some articles to a specific one of the weighing balances, which carries the least weight of articles, when no desired combination appears during a cycle of combination operation.

In accordance with this invention, the combination weighing device comprises a plurality of weighing balances for weighing a plurality of articles each to produce electric signals respectively representative of the weights measured, arithmetic means having a plurality of inputs for receiving said electric signals for summing up the received signals, comparing the sum with reference signals indicative of a predetermined range of weight and, when the sum is within said range, generating an output signal, a plurality of normally-open switches with control terminal respectively connected between said balances and the inputs of said arithmetic means, switch control means having output terminals connected respectively to the control terminals of said normally-open switches for generating control signals from said output terminals selected successively in accordance with a predetermined set of combinations to close the corresponding switches, and output means for storing the combined outputs of said control means successively and responding to the output signal of said arithmetic means to supply the combined outputs stored at that time to a utilization means. A feature of this invention is that the device also comprises trouble detecting means for detecting lack of output from the output means during a cycle of operation of said switch control means, a ramp generator for responding to the output signal of said detecting means to produce a ramp signal, a plurality of comparators each having a first input terminal for receiving the ramp signal and a second input terminal for receiving the output signal of each weighing balance, and second output means for responding to the output signals of said comparators to supply control output signals to the corresponding ones of said utilization means.

These and other objects and features of this invention will be described in more detail hereinunder with reference to the accompanying drawing.

The single drawing shows a circuit configuration, in block form, of an embodiment of the combination weighing device according to this invention.

As aforementioned, the combination weighing device includes a plurality of weighing balances (not shown) having automatic loading and unloading mechanisms (not shown) and weight sensors $10_1, 10_2, \ldots 10_n$, respectively. Each weight sensor is composed of a suitable electromechanical transducer, such as a load cell, and serves to produce a voltage level indicative of the weight of articles on the associated balance. The outputs of the weight sensors $10_1, 10_2, \ldots 10_n$ are coupled respectively through normally-open switches $12_1, 12_2, \ldots 12_n$ to "plus" inputs of an adder-subtracter circuit 14 which also includes a "minus" input coupled to the output of a reference weight memory 16. The reference weight memory 16 may be a suitable potential source preset to produce a voltage level indicative of a reference weight, that is, intended combined weight of articles.

The adder-subtracter circuit 14 may be of a conventional type which acts to sum up the voltage levels coming in the "plus" inputs and subtract the voltage level at the "minus" input from the resultant sum to produce an output voltage indicative of the deviation of the combined weight from the reference weight. It will be understood that the output of the adder-subtracter 14 should be a positive, zero or negative voltage.

The normally-open switches $12_1, 12_2, \ldots 12_n$ are provided respectively with control terminals and arranged to close upon reception of control signals therein. The control terminals of the switches $12_1, 12_2, \ldots 12_n$ are coupled respectively to n-number of outputs of a combination generator 18. The combination generator 18 is a device for producing the control signal successively from its outputs in accordance with a predetermined set of mathematical combinations of the output terminals. A typical example of the combination generator is an n-bit binary counter driven by a suitable clock pulse generator 20, having parallel outputs or bit outputs as the outputs of the combination generator 18, respectively. In this case, the total number of possible combinations of the output terminals should be $2^n - 1$ and all combinations of the outputs will be produced successively. When the switches are arranged to close in response to a binary "1" control signal, for example, the switches will encounter all combinations of actuation while the counter counts from zero to the extreme.

It should be understood that the combination generator 18 is not limited to the n-bit binary counter but can be realized with various circuits by those skilled in the art in accordance with user's requirements. For example, the combination generator 18 may be designed so as to produce only combinations of m (which is less than n) outputs from the n outputs in order to save operation time.

The output of the adder-subtracter circuit 14 is applied to first inputs of a pair of comparator circuits 22 and 24, the second inputs of which are coupled respectively to the outputs of an allowable upper deviation (AUD) memory 26 and an allowable lower deviation (ALD) memory 28. The AUD memory 26 may be a suitable voltage source preset to produce a positive voltage level indicative of a predetermined allowable upper deviation of the combined weight of articles from the reference weight, while the ALD memory 28 may be a suitable voltage source preset to produce a negative voltage level indicative of a predetermined allowable lower deviation of the combined weight from the reference weight. The preset voltage level of the memory 26 or 28 may be zero level, if necessary. The comparator 22 produces an output when its first input is less positive than its second input, while the comparator 24 produces an output when its first input is less negative than its second input. Thus, both comparators 22 and 24 will apply their outputs at the same time to an AND circuit 30 when the combined weight falls within the allowable upper and lower deviations.

The output signal of the AND circuit 30, which indicates detection of allowable or intended combination, is applied to a control terminal of a combination memory 32. The combination memory 32 has n-number of inputs coupled respectively to the n outputs of the combination generator 18, and corresponding output terminals coupled respectively to gate control units of the loading and unloading mechanisms of the weighing balances. The combination memory 32 is designed suitably to store successive combinations of outputs of the combination generator 18 temporarily and, when the AND circuit 30 applies a control input, discharge the content at that time from the corresponding output terminals. Thus, the unloading and loading mechanisms of the weighing balances corresponding to the allowable combination are actuated sequentially to discharge their contents for collection into a group and, then, to supply new articles thereon, so that the system is now ready for a new cycle of operation.

The structure and operation of the combination weighing device as described schematically above are common to the prior art devices and further description is not deemed necessary. Now the description will be made in conjunction with the features of this invention.

In the prior art devices, if no allowable combination is detected, no control signal will be applied to the combination memory 32 and, therefore, the system operation will be interrupted. In the present device, however, a NOR circuit consisting of an OR gate 34 having all outputs of the combination memory 32 as its inputs and an invertor 36 having an input coupled to the output of the OR gate 34 will produce an output which is in turn supplied to one input of an AND gate 38. At the end of cycle of combination, the combination generator 18 produces a signal which is in turn applied to the other input of the AND gate 38, thereby the AND gate 38 supplies an output to a set terminal S of a ramp generator 40. The ramp generator 40 is designed conventionally to generate a linearly increasing ramp voltage in response to its set input and to be reset by a signal at its reset input R.

The output ramp voltage of the ramp generator 40 is applied to one input of each comparator $42_1$, $42_2$, ... $42_n$, and the output voltages of the weight sensors $10_1$, $10_2$, ... $10_n$ are also applied to a second input of each of the corresponding comparators, respectively. The comparators $42_1$, $42_2$, ... $42_n$ are arranged to supply their outputs to set inputs S of flip-flops $44_1$, $44_2$, ... $44_n$, respectively, when both inputs coincide with each other. The non-inverted outputs Q of the flip-flops $44_1$, $44_2$, ... $44_n$ are coupled respectively to loading gate control mechanisms of the corresponding weighing balances for supplying some additional articles thereto.

The Q outputs of the flip-flops are also coupled through an OR gate 46 to the reset terminal R of the ramp generator 40 and to a set terminal S of a timer circuit 48. The timer 48 is designed to produce a reset pulse from its reset output R after a predetermined time interval from the reception of set input S. The reset pulse is supplied from the timer 48 to reset inputs R of the flip-flops 44 through an AND gate 50 whose second input is supplied also from the output of the OR gate 48 in order to confirm presence of any output of the flip-flops 44.

In operation, the ramp generator 40 is actuated to produce an increasing voltage when no allowable combination is detected, as described above. It will be easily understood that one of the comparators 42, which is receiving the lowest one of the voltages produced from the weight sensors 10, will be the first to produce an output. Assuming now this earliest actuated comparator is the comparator $42_2$, that is, assuming that the weight sensor $10_2$ is producing the lowest voltage of all.

The flip-flop $44_2$ is set by the output of the comparator $42_2$ and its Q output is supplied through the OR gate 46 to the reset terminal R of the ramp generator 40 to reset it. Therefore, the output voltage of the ramp generator 40 returns to its initial level, for example, zero level, and inhibits actuation of the other comparators $42_1$, $42_3$, ... $42_n$. The output of the flip-flop $44_2$ is also supplied to the loading gate control mechanism of the weighing balance having the weight sensor $10_2$ to open its loading gate.

The Q output of the actuated flip-flop $44_2$ is also applied through the OR gate 46 to the set input of the timer circuit 48 to start it. After a preset length of time, the timer 48 produces a reset pulse from its reset output R and applies it through the AND gate 50 to the reset inputs R of the flip-flops 44 to reset the flip-flop $44_2$ to close the loading gate. Then, the system operation can be repeated properly. Thus, the number of articles added to the corresponding balance is determined by the preset time in the timer 48.

As described above, according to the features of this invention, normal operation can be automatically restored, even when no allowable combination of weights is detected by the arithmetic unit.

It should be understood that the above description has been made in conjunction with one embodiment for illustrative purpose only and various modifications and changes can be made by those skilled in the art in accordance with the principle of this invention. For example, though the above embodiment has been described as constructed as an analog system, the device can be constructed also as a digital system. In that case, the weight indicating signals may be digital signals with sign (plus or minus) indicating digits, and the ramp generator 40 may be a suitable counter.

What is claimed is:

1. A combination weighing device, comprising a plurality of balances for weighing a plurality of articles to produce electric signals indicative of the measured weights, respectively; arithmetic means having a plurality of input terminals for receiving said electric signals, respectively, for summing up the received electric signals, comparing the resultant sum with reference signals indicative of a predetermined range of weight and, when the sum falls within said range, producing an output signal; a plurality of normally-open switches provided with control terminals and inserted between said weighing balances and said input terminals of said arithmetic means, respectively; switch control means having output terminals coupled respectively to said control terminals for producing control signals from said output terminals selected successively in accordance with a predetermined set of combinations to close the corresponding ones of said normally-open switches; and output means for storing said combinations of the outputs of said switch control means successively and responding to the output signal of said arithmetic means to supply a combination of outputs stored at that time to utilization means; trouble detecting means for detecting lack of output from said output means during each cycle of operation of said switch control means to produce an output signal; a ramp generator for generating a ramp signal in response to the output signal of said detecting means; a plurality of comparators having a first input terminal for receiving said ramp signal and a second input terminal for receiving the output signal from each weighing balance to produce an output signal when both input signals coincide with each other; and second output means for responding to the output of said comparator to supply an output control signal to corresponding one of said utilization means.

2. A combination weighing device according to claim 1 wherein said second output means comprise a plurality of flip-flops arranged to be set by the outputs of said comparators, respectively, to produce said output control signals and timer means responsive to the output of any of said flip-flops for supplying a reset signal after a preset length of time to said flip-flops to reset them; and said ramp generator is arranged to stop operation in response to the output of said flip-flops.

* * * * *

UNITED STATES PATENT OFFICE
CERTIFICATE OF CORRECTION

Patent No. 4,341,274          Dated July 27, 1982

Inventor(s) Takashi Hirano and Takashi Aga

It is certified that error appears in the above-identified patent and that said Letters Patent are hereby corrected as shown below:

Claim 1, Column 6, line 7, after "comparators" insert --each--; line 9, after "from" delete "each" and insert --the associated--; line 13, after "to" second occurrence insert --the--

Signed and Sealed this

Seventeenth Day of May 1983

[SEAL]

Attest:

DONALD J. QUIGG

Attesting Officer          Acting Commissioner of Patents and Trademarks